United States Patent [19]

Kirker et al.

[11] Patent Number: 4,728,439

[45] Date of Patent: Mar. 1, 1988

[54] METHOD FOR FLOCCULATING SUSPENSIONS CONTAINING SWELLED LAYERED CHALCOGENIDE

[75] Inventors: Garry W. Kirker, Washington Township, Gloucester County; Sowmithri Krishnamurthy, Cherry Hill, both of N.J.

[73] Assignee: Mobil Oil Corporation, New York, N.Y.

[21] Appl. No.: 44,184

[22] Filed: Apr. 30, 1987

[51] Int. Cl.$^4$ .............................................. C02F 1/56
[52] U.S. Cl. .................................... 210/727; 423/81; 423/333; 502/62; 502/232; 502/242; 502/507
[58] Field of Search ................... 423/81, 333; 502/62, 502/67-69, 76, 151, 232, 242, 507, 527; 210/724-728, 732-736

[56] References Cited

U.S. PATENT DOCUMENTS

| | | | |
|---|---|---|---|
| 4,009,103 | 2/1977 | Burke | 210/725 |
| 4,046,684 | 9/1977 | Tsunoda et al. | 210/727 X |
| 4,288,422 | 9/1981 | Chianelli et al. | 423/509 |
| 4,414,137 | 11/1983 | Young et al. | 502/162 |
| 4,569,768 | 2/1986 | McKinley | 210/727 |

*Primary Examiner*—Tom Wyse
*Attorney, Agent, or Firm*—A. J. McKillop; M. G. Gilman; L. P. Hobbes

[57] ABSTRACT

A method is disclosed for flocculating suspensions containing (a) layered oxide materials intercalated with a hydrophobic swelling agent and (b) nonintercalated hydrophobic swelling agent. The suspension is contacted with a ketone, water, and a cationic organic polymer; the resulting mixture is maintained at a sufficiently alkaline pH to prevent removal of the intercalated swelling agent during the flocculation treatment. This method is particularly useful for preparing swelled layered chalcogenide materials for the introduction of interspathic polymeric chalcogenide precursors in order to form a thermally stable product.

15 Claims, No Drawings

METHOD FOR FLOCCULATING SUSPENSIONS CONTAINING SWELLED LAYERED CHALCOGENIDE

The present invention relates to a method for flocculating aqueous suspensions containing a swelled layered chalcogenide material.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the interlamellar spacing can be increased substantially by absorption of various swelling agents such as water, ethylene glycol, amines, ketones, etc., which enters the interlamellar space and push the layers apart. However, the interlamellar spaces of such layered materials tend to collapse when the molecules occupying the space are removed, for example, by exposing the clays to high temperatures. Accordingly, such layered materials having enhanced surface area are not suited for use in chemical processes involving even moderately severe conditions.

Layered metal chalcogenide materials enjoying thermal stability can be prepared by a method described in U.S. application Ser. No. 879,787, filed June 27, 1986, and incorporated herein by reference. The method comprises: treating a layered chalcogenide, e.g., oxide, of at least one element having an atomic number of 4, 5, 12 to 15, 20 to 33, 38 to 51, 56 to 83 and greater than 90, inclusive, which contains ion exchange sites having interspathic cations associated therewith, with an organic compound which is a cationic species, e.g., n-alkylammonium or capable of forming a cationic species e.g., n-alkylamine, to effect exchange with said interspathic cations in order to swell the layered material. An electrically neutral compound capable of conversion to an interspathic polymeric chalcogenide, e.g., tetraethylorthosilicate, is thereafter provided between the layers of the swelled, layered chalcogenide. The compound is then converted to the interspathic polymeric chalcogenide to form the layered material.

The present invention relates to a method for filtering the layered chalcogenide which has been swelled by treatment with the above-mentioned organic compound which is either a cationic species or capable of forming a cationic species. The swelled layered material is present in an aqueous slurry or as a suspension and is ordinarily separated by means of filtration and dried before treatment with an electrically neutral compound capable of conversion to the interspathic polymeric chalcogenide between the layers of said material. Simple filtration has been found to be time-consuming insofar as the swelled layered material is in a highly dispersed state. Accordingly, there exists a need for a method of flocculating aqueous suspensions comprising swelled layered chalcogenide materials.

Many flocculating agents are known. See, e.g., "Flocculating Agents," Kirk - Othmer Encyclopedia of Chemical Technology, Third Edition Volume 10, pp. 484 to 523, incorporated herein by reference. Synthetic organic materials are of particular interest as flocculants. Such materials include water-soluble polymeric substances with weight average molecular weights ranging from about $10^3$ to greater than $5 \times 10^6$. Where subunits of the polymer possess a positive charge, the polymer is known as a cationic organic polymeric flocculant.

These cationic polymers include polyammonium compounds such as poly(alkylene polyamines) and poly(hydroxyalkylene polyamines) which are step-growth polymerization products of polyfunctional amines and alkyl dihalides or bifunctional alkyl epoxides and alkyl epoxide derivatives. Polyamine quaternaries, another cationic polymer group are prepared by quaternization of poly(alkylene polyamines) and poly(hydroxyalkylene polyamines) with alkyl halides or sulfates or by step-growth polymerization from dialkylamines, tetraalkyl amines, or derivatives thereof, with suitable bifunctional alkylating agents, and with or without small amounts of polyfunctional primary amines. Vinyl conversion products such as cationic carbamoyl polymers are also useful as cationic flocculation agents.

The present invention relates to a method for flocculating an aqueous suspension comprising (1) a layered chalcogenide material having ion exchange sites and swelled with an intercalated hydrophobic swelling agent and (2) nonintercalated, excess hydrophobic swelling agent. The method comprises (a) contacting said suspension with a ketone, water, and a cationic organic polymeric flocculant; (b) maintaining the resulting mixture at a sufficiently alkaline pH to prevent exchange of said intercalated hydrophobic swelling agent; and (c) separating the swelled layered chalcogenide material from the aqueous mixture. The resulting layered chalcogenide material remains swelled after the separating step.

The floc mixture can comprise about 3 to 10 wt. % ketone based upon total solution and about 1 to 3 wt. % of cationic organic polymer based upon actual solids in the slurry. The slurry is diluted to about 2 to 6 times the initial slurry volume using the ketone/water solution. The cationic organic polymeric flocculant is added in proportion to the amount of suspension solid at about 1 to 5 parts, preferably about 1 to 3 parts by weight compared to the weight of suspension solid.

The present invention relates to a discovery that the presence of a small amount of ketone solvent during flocculation with a cationic polymer at a controlled pH results in a dramatic improvement in filtration rates. Such treatment does not destroy the integrity of the intercalated material which can therefore be treated with a hydrolyzable pillaring agent to form a thermally stable pillared product.

The layered chalcogenide material employed in the present invention can be a layered oxide, sulfide, selenide or telluride, preferably a layered oxide material. Suitable layered oxide materials include layered oxides of Group IVA metals such as titanium, zirconium and hafnium, e.g., layered titanates such as $Na_2Ti_3O_7$ as disclosed in U.S. Pat. Nos. 4,600,503, and 2,496,993 incorporated herein by reference. Other layered chalcogenide materials in which the present invention may be used to facilitate intercalation include $KTiTaO_5$ and $Na_4Mn_{14}O_{27}9H_2O$, as well as layered oxides of alumina and silicon such as clays, e.g. bentonite. In particular, the present invention can facilitate intercalation of layered silicates known as high silica alkali silicates whose layers lack octahedral sheets. These silicates can be prepared hydrothermally from an aqueous reaction mixture containing silica and caustic at relatively moderate temperatures and pressures, and may contain tetracoordinate framework atoms other than Si. Included among these materials are magadiite, natrosilite, kenyaite, makatite and kanemite, preferably their acid-exchanged forms.

The hydrophobic swelling agent employed in the present invention comprises a source of organic cation such as organoammonium, which source may include the cation itself, in order to effect an exchange of the interspathic cations resulting in the layers of the starting material being propped apart. In particular, protonated alkylamines are preferred. Often, alkylammonium cations include n-dodecylammonium, n-octylammonium, n-heptylammonium, n-hexylammonium and n-propylammonium. The source of organic cation in those instances where the interspathic cations include hydrogen or hydronium ions may include a neutral compound such as organic amine which is converted to a cationic analogue during the swelling or "propping" treatment. Among these materials are $C_3$ to $C_{10}$, preferably $C_6$ to $C_8$ alkylamines, preferably n-alkylamines, or $C_3$ to $C_{10}$, preferabl $C_6$ to $C_8$ alkanols, preferably n-alkanols.

Any ketone may be used in the flocculation step which is capable of solubilizing the hydrophobic swelling agent employed. Such ketones include $C_3$ to $C_{10}$ ketones, preferably $C_3$ to $C_5$ ketones, e.g. methylethylketone or acetone. Preferably the ketone is added to the suspension prior to addition of the cationic organic polymeric flocculant.

The cationic organic polymeric flocculant employed can have a molecular weight of about $5 \times 10^5$ to $10 \times 10^6$, preferably about $1 \times 10^6$ to $5 \times 10^6$. Such materials are synthetic polyelectrolytes carrying a positive charge that serve to destabilize an emulsion by a combination of (a) bridging and (b) charge neutralization.

pH conditions employed in the present invention are generally sufficiently alkaline so as to prevent the formation of protons which will undesirably exchange with protonated amine or alkanol swelling agent, resulting in collapse of the layered chalcogenide structure. Generally, the pH should be greater than about 5, preferably from about 9 to 11.

The invention is further described by the following examples which are not intended to be limiting in any way.

EXAMPLE 1

Preparation of n-Octylamine Swollen H-Magadiite and Recovery by Straight Filtration Twenty grams of natural magadiite were sized to pass through a 25 mesh size screen and added to 100 ml of $H_2O$. The mixture was adjusted to a pH of about 2 and held there by addition of 0.1 N HCl within a 24 hour period. A total of 435 ml of 0.1N HCl was used. The sample was filtered, water-washed and dried. The x-ray pattern of the sample showed a peak at 7.8° (2 theta) evincing an 11.3A d-spacing indicating the structure was in a collapsed state. The calcined sample (3 hours at 538° C. in air) had the same d-spacing. The adsorption properties were 27 $m^2/g$ surface area, 0.8% $H_2O$, 1.2% $CyC_6$ and 2.0% n-$C_6$. 500 g of an aqueous slurry containing 675 g of the acid-exchanged magadiite were treated with 1600 g of n-octylamine to prop open or swell the layers. In order to recover the swelled product, 100 cc of the above slurry was subjected to vacuum filtration, a process which required more than 16 hours to recover 14 gms of the swelled product.

EXAMPLE 2

Flocculation of n-Octylamine Swollen Magadiite Slurry Using Cationic Organic Polymeric Flocculant and Alcohol 100 cc of the slurry described above were mixed with 25 cc of i-propyl alcohol, 375 cc of water and 1 gm of Hercofloc ® 834, a cationic polymer, at a pH of 10. Hercofloc ® 834 is a cationic polymer which is composed of an acrylamide based copolymer with a typical viscosity range of 50,000 to 100,000 cps, sold by Hercules, Inc. 100 cc of the resultant slurry was found to filter in 5 minutes. However, X-ray diffraction (XRD) analysis of the filter cake indicated that the layers had collapsed due to removal of the octylamine.

EXAMPLE 3

Flocculation of n-Octylamine Swollen Magadiite Slurry Using Cationic Organic Polymeric Flocculant and Ketone (Acetone)

The procedure of Example 2 was repeated but with the i-propyl alcohol being replaced by acetone. 100 cc of the resultant slurry were found to filter in 5 minutes. XRD analysis of the filter cake indicated that the octylamine was retained between the silicate layers of the magadiite.

EXAMPLE 4

Flocculation of n-Octylamine Swollen Magadiite Slurry Using Cationic Organic Polymeric Flocculant and Ketone (Methylethyl Ketone)

The procedure described in Example 3 was repeated with 25 cc of methylethylketone instead of acetone. 100 cc of the resultant slurry were found to filter in 5 minutes. XRD analysis of the filter cake indicated that the octylamine was retained between the silicate layers of the magadiite.

It is claimed:

1. A method for flocculating an aqueous suspension comprising (1) a solid layered chalcogenide material having ion exchange sites and swelled with an intercalated hydrophobic swelling agent and (2) nonintercalated, excess hydrophobic swelling agent; which method comprises (a) contacting said suspension with ketone, water, and a cationic organic polymeric flocculant; (b) maintaining the resulting mixture at a sufficiently alkaline pH to prevent exchange of said intercalated hydrophobic swelling agent; and (c) separating said swelled layered chalcogenide material from said aqueous mixture; whereby said layered chalcogenide material remains swelled after said separating.

2. The method of claim 1 wherein said layered chalcogenide comprises a layered oxide.

3. The method of claim 2 wherein said layered oxide material is selected from the group consisting of layered titanate and layered high silica alkali silicate.

4. The method of claim 3 wherein said layered titanate is $Na_2Ti_3O_7$.

5. The method of claim 3 wherein said layered high silica alkali silicate are selected from the group consisting of magadiite, natrosilite, kenyaite and makatite.

6. The method of claim 5 wherein said layered high silica alkali silicate is magadiite.

7. The method of claim 1 wherein said hydrophobic agent is selected from the group consisting of $C_3$ to $C_{10}$ alkylamines and $C_3$ to $C_{10}$ alkanols, said ketone is selected from the group consisting of $C_3$ to $C_{10}$ ketones, said cationic organic polymeric flocculant has a molecular weight of about $5 \times 10^5$ and said pH ranges from about 9 to 11.

8. The method of claim 1 wherein said hydrophobic agent is selected from the group consisting of $C_6$ to $C_8$ alkylamines and $C_6$ to $C_8$ alkanols, said ketone is selected from the group consisting of $C_3$ to $C_5$ ketones, said cationic organic polymeric flocculant has a molecular weight of about $1 \times 10^6$ to $3 \times 10^6$, and said pH ranges from about 9.5 to 10.5.

9. The method of claim 1 wherein said suspension is contacted with said ketone prior to contact with said cationic organic polymeric flocculant.

10. The method of claim 1 wherein said hydrophobic swelling agent is a protonated alkylamine.

11. The method of claim 1 wherein said layered chalcogenide material is acid-exchanged prior to intercalation with said hydrophobic swelling agent.

12. The method of claim 1 wherein said layered chalcogenide material is acid-exchanged magadiite, said hydrophobic swelling agent is n-octylamine, said ketone is acetone, said cationic organic polymeric flocculant has a molecular weight of about $1 \times 10^6$ to $5 \times 10^6$ and said pH ranges from about 9.5 to 10.5.

13. The method of claim 12 wherein said ketone is methylethylketone.

14. The method of claim 1 wherein said mixture comprises ketone and water in proportions of about 1 to 20 parts by weight of ketone and about 99 to 80 parts by weight of water, and said cationic organic polymeric flocculant is added in proportion to the suspension solid at about 1 to 5 parts by weight compared to the solids weight.

15. The method of claim 1 wherein said mixture comprises ketone and water in proportions of about 3 to 10 parts by weight of ketone and about 97 to 90 parts by weight of water, and said cationic organic polymeric flocculant is added in proportion to the suspension solid at about 1 to 3 parts by weight compared to the solids weight.

* * * * *